Oct. 18, 1966  E. KIESER ETAL  3,279,569
CAMSHAFT ASSEMBLY FOR CARRIAGE WHEEL BRAKING MECHANISM
Filed Aug. 10, 1964
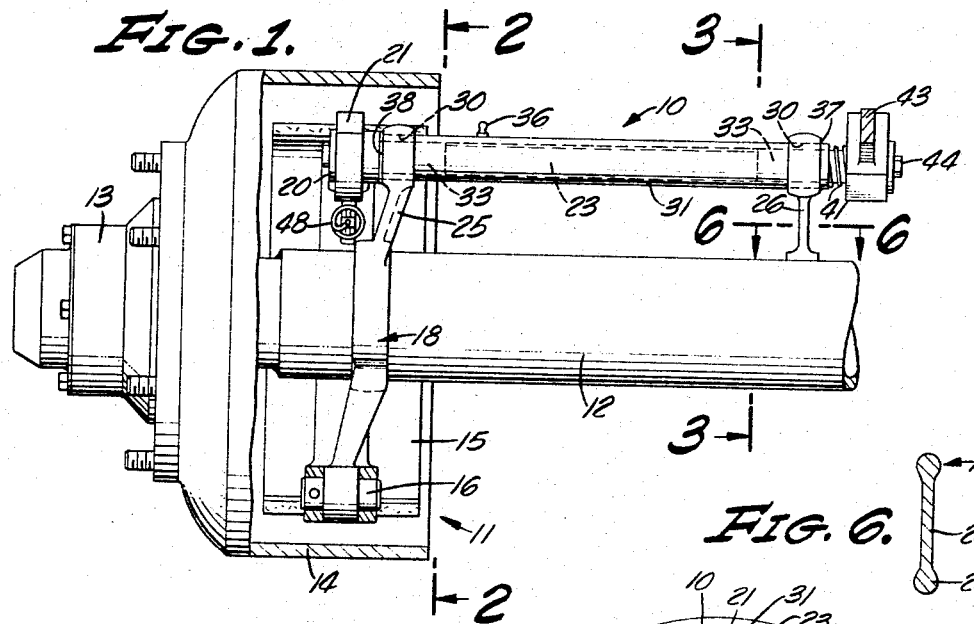
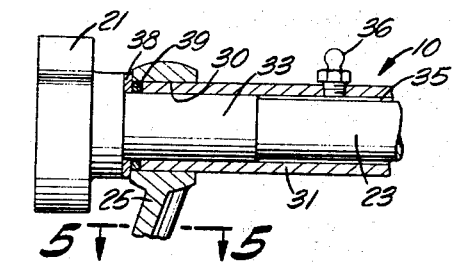
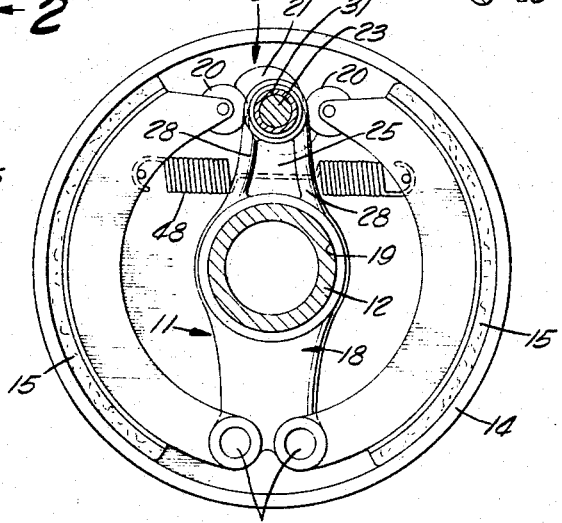
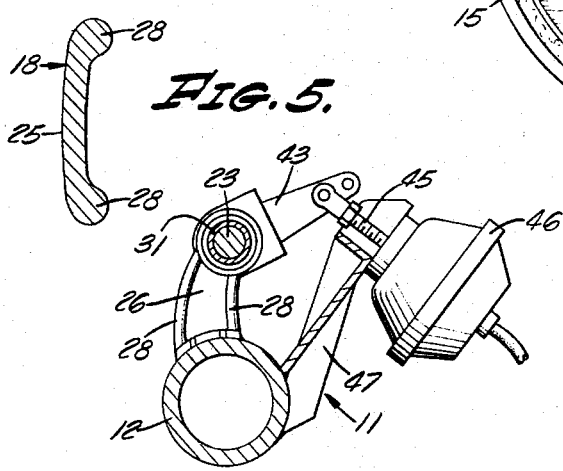
ARNOLD F. BEHNKE
EDWARD KIESER
INVENTORS.
BY
ATTORNEY

United States Patent Office 3,279,569
Patented Oct. 18, 1966

3,279,569
CAMSHAFT ASSEMBLY FOR CARRIAGE WHEEL BRAKING MECHANISM
Edward Kieser, Arcadia, and Arnold F. Behnke, Rosemead, Calif., assignors to Kay-Brunner Steel Products, Los Angeles, Calif., a corporation of Delaware
Filed Aug. 10, 1964, Ser. No. 388,361
9 Claims. (Cl. 188—206)

This invention relates to heavy-duty braking mechanisms and more particularly to an improved rugged camshaft assembly adapted to be firmly mounted to the side of a carriage axle housing with its cam end in operating relation to braking mechanism for the carriage wheels.

Vehicle carriage assemblies, particularly of the type having pneumatically operated braking systems, customarily employ camshafts for operating the shoes from a pneumatically actuated booster mounted on the axle housing. Frequently very high load forces are employed for this purpose thereby placing heavy strain not only on the camshaft assembly but on other components structurally associated therewith. Furthermore the axle housings themselves and the braking mechanism are subjected to heavy strains and deflections owing to varying loads being transported by the vehicle as well as shock loads imposed while passing over rough roads. In consequence the supporting brackets for the camshafts and in particular the bearings between these brackets and the camshaft are subjected to brutal treatment. Early and premature failure of the brackets and more particularly of the bearings for these shafts is a frequent occurrence. The servicing and replacement of unserviceable parts is a costly operation invariably requiring removal of the vehicle wheels, the brake drums and other components. This operation requires the use of heavy-duty equipment and the services of skilled personnel and involves costly layup of the equipment for protracted periods of time.

With the foregoing and other shortcomings of prior constructions in mind it is the purpose of this invention to provide an improved, simplified and less costly camshaft assembly avoiding the defects and shortcomings of prior constructions and found to operate for much longer periods of time without need for servicing or the replacement of parts. To this end the new camshaft assembly includes a pair of supporting brackets so designed as to flex in planes parallel to one another and generally axially of the camshaft and of the carriage axle. This designed and builtin flexibility of the supporting brackets enables the camshaft assembly to experience wide range twisting and flexure normally encountered in the use of this and its associated equipment and assures the return of the camshaft to its normal operating position during and after removal of the deflecting load strain.

A further and highly important feature of the invention is the use of much wider bearing surfaces than normally at the opposite ends of the camshaft which bearing surfaces are formed in part by a common unitary thin-walled protective camshaft shroud. This shroud tube has a snug fit with the supporting brackets and is preferably welded or otherwise positively secured to at least one of these brackets. This protective tube is substantially as long as the camshaft itself and has one end pressing against a resilient sealing gasket bearing against the adjacent end face of the brake shoe operating cam. A resilient spring or the like is interposed between the other end of this protective tube and the operating arm connection to the brake booster. By relieving the mid-length portion of the camshaft slightly, a large volume lubricant storage chamber is provided quite adequate to maintain camshaft bearings constantly lubricated throughout the life of the assembly. It will also be appreciated that the improved camshaft assembly of this invention inherently possesses excellent safeguards against the entry of foreign matter to the bearing surfaces. This fact together with the unusually large bearing area for the camshaft provides assurance of trouble-free service life for the camshaft assembly equivalent to the life of the equipment on which the assembly is installed.

Accordingly it is a primary object of the present invention to provide an improved, highly flexible, and resilient camshaft assembly suitable for use with pneumatically operated braking systems.

Another object of the invention is the provision of a novel camshaft assembly having a pair of supporting brackets adapted to be welded to a carriage axle housing and designed for limited flexure and twisting in planes lying generally normal to the carriage axle.

Another object of the invention is the provision of a camshaft assembly in which substantially the full length of the camshaft proper is enclosed by a protective tubular shroud and bearing member exhibiting numerous advantages.

Another object of the invention is the provision of a brake shoe operating camshaft having a tubular shroud supported in brackets and arranged to provide dust-free large-area bearing surfaces between its interior side wall and the opposite end portions of the camshaft.

Another object of the invention is the provision of an improved camshaft assembly for a braking mechanism featuring a flexible supporting bracket at one end thereof and simple but highly effective limited floating support of its other end to accommodate strains and flexure of components in the immediate operating environment.

These and other more specific objects will appear upon reading the following specification and claims and upon considering in connection therewith the attached drawing to which they relate.

Referring now to the drawing in which a preferred embodiment of the invention is illustrated.

FIGURE 1 is a fragmentary side elevational view from one end of a carriage axle and brake assembly with parts broken away to show details of the structure;

FIGURE 2 is a cross-sectional view taken along line 2—2 on FIGURE 1;

FIGURE 3 is a cross-sectional view showing details of the brake booster and its operating connection with the camshaft and taken along line 3—3 on FIGURE 1;

FIGURE 4 is a fragmentary view on an enlarged scale through the cam end of the camshaft; and FIGURE 5 is a cross-sectional view taken along line 5—5 on FIGURE 4; and FIGURE 6 is a corresponding cross-sectional view taken along line 6—6 on FIGURE 1.

Referring first more particularly to FIGURE 1 there is shown a preferred embodiment of the invention camshaft assembly designated generally 10 in its normal operating relationship to typical braking mechanism designated generally 11 for the rear carriage of a truck. This carriage assembly includes an outer tubular housing 12 for the carriage axle (not shown) but to the opposite ends of which is suitably secured a wheel mounting hub 13 and the usual brake drum 14. As herein shown, braking mechanism 11 includes a pair of brake shoes 15 having their adjacent ends pivotally supported on pins 16 suitably secured to one end of a brake shoe anchor casting 18. Casting 18 is provided with a central opening 19 sized to telescope over one end of axle housing 12 and is welded or otherwise securely fastened to this housing. The other end of each brake shoe is provided with a roller held pressed by a tension spring 48 against the opposite sides of the S-shaped actuating cam 21 here shown as integral with one end of camshaft 23.

Camshaft assembly 10 is supported by a pair of brackets 25, 26 in the manner best shown in FIGURE 1, bracket 25 here being shown as an integral part of anchor casting 18. It will be understood that bracket 25 may be formed separately from the anchor casting 18 or, alternatively, it may be identical with bracket 26. Of importance is the fact that at least one of the brackets, as 26, has a wide but thin web arranged generally normal to the axis of housing 12. Accordingly it will be recognized that this bracket possesses very considerable rigidity as respects loads applied against either lateral edge but that it is relatively flexible as respects loads applied transversely of its thin web, that is axially of housing 12. As here shown the opposite lateral edges of both brackets are thickened as indicated at 28 but the intervening web portion proper is relatively thin and highly flexible for purposes to be explained in greater detail below.

Each of brackets 25, 26 is provided at its outer end with a large opening having a snug fit with a thin walled tubular shroud 31 encircling camshaft 23 substantially throughout its length. Shroud 31 provides a dust guard and protective cover for the camshaft and its interior wall presents a wide bearing surface for the opposite ends of the camshaft. Cooperating therewith on camshaft 23 are smoothly finished bearing surfaces 33 having an axial length very substantially greater than the axial length of openings 30 in the supporting bracket. It will therefore be recognized that the camshaft bearings are sufficiently great as to assure relatively low loading and therefore long service life. An additional advantage is that this arrangement avoids the need for babbitting, bearing brasses, or the like, heretofore commonly employed as journals for the camshaft. Shroud tube 31 is preferably formed of any suitable material as, for example, steel and aluminum. Satisfactory results have also been obtained using plastic material, such as polyethylene and similar plastic materials, for the shroud tube.

The portion of the camshaft between bearing surfaces 33, 33 is preferably relieved as best shown in FIGURE 4 to provide a lubricant storage chamber 35. This chamber is chargeable with lubricant through a suitable fitting 36 mounted in shroud 31 and includes a normally closed check valve to safeguard against the entry of foreign matter.

Referring to FIGURE 4, it is pointed out that a thrust-bearing ring 38 is interposed between the outer end face of bracket 25 and the hub of S-cam 21. If desired, a resilient packing ring, as O-ring 39, is interposed between thrust bearing 38 and the adjacent end of shroud tube 31 to prevent the entry of foreign matter or fluids to the bearing surfaces.

The inboard end of tube 31 is preferably welded to bracket 26 as indicated at 37. A stiff compression spring 41 has one end bearing against tube 31 and its other end bearing against a rigid arm 43 splined to the end of camshaft 23 and held assembled thereto by cap screw 44 threaded into an opening in the end of the camshaft. The camshaft operating arm 43 is connected in known manner to the output rod 45 of a conventional pneumatic booster 46 rigidly secured to a bracket 47 welded to axle housing 12. When braking pressure is admitted to booster 46, rod 45 rotates arm 43 and thereby camshaft 23. This rotation acts through S-cam 21 on rollers 20, 20 to pivot the brake shoes away from one another and into engagement with brake drum 14 in well known manner.

The mode of assembly of the described camshaft assembly 10 will be quite apparent from the foregoing detailed description of the illustrated components. Initial assembly is accomplished prior to installation of brake drum 14 on the hub of and axle of the carriage unit, it merely being necessary to telescope anchor casting 18 over the end of the unobstructed axle housing 12. Thereafter the anchor casting is welded to the housing and the base of bracket 26 is welded to the axle housing care being taken to hold the camshaft seating openings 30 in alignment with one another and parallel to the axis of the housing. Camshaft 23 may and usually is already installed within the shroud tube interconnecting brackets 25 and 26. After the welding operations have been performed, arm 43 is assembled to the camshaft and is connected to booster operating link 45. The brake shoes are then connected to pivot pins 16, 16 and their rollers 20, 20, are held in position against the opposite sides of S-cam 21 by the tension spring 48 in the usual way following which the brake drum and wheels are assembled to the axle.

As is well known to equipment designers, it is customary for axle housing 12 to be designed to exhibit a decided upward bow or camber in its normal unloaded condition. However, when the vehicle is partially or fully loaded, the load forces will tend to flatten the axle housing to some degree. During operation over the highway under loaded conditions, the severe shocks caused by uneven and irregular road conditions result in further and sometimes severe bending and flexure of the axle housing. Additionally, application of the brakes and the incident forces tending to cause brake hopping pose additional severe and intermittent load stresses on all of the components including the axle housing and the brake operating camshafts and their supporting brackets. The resulting twisting and flexure is readily accommodated in the present design by reasons of flexible bracket 26 interconnecting the brake operating camshafts with the axle housing and the floating assembly existing between bracket 25, shroud 31, and camshaft 23. This flexure and floating connection together with the wide bearing surfaces between the opposite ends of the camshaft and the supporting shroud tube 31 minimizes the load forces applied to the bearing surfaces with the result that the camshafts and their bearings have greatly increased service life. Furthermore the bearing surfaces are maintained constantly lubricated by the reserve supply of lubricant trapped in chamber 35 and this supply is continually working its way outwardly axially along the bearings thereby tending to purge any foreign matter or fluid endeavoring to enter the journal surfaces from the outer ends of the shroud tube. For this purpose, the reserve supply of lubricant may be charged into chamber 35 under slight super atmospheric pressure, a factor effective in preventing foreign matter from entering from the outer ends of the journal surfaces. It is also pointed out that spring 41 circling the inboard end of the camshaft remains constantly effective to maintain light pressure on thrust bearing 38.

It will be understood that if identical or similarly flexible brackets are employed at the opposite ends of the camshaft, when the floating connection between shroud tube 31 and bracket 25 may be dispensed with since the flexibility of this latter bracket eliminates the need for the flexible connection.

While the particular camshaft assembly for carriage wheel braking mechanism herein shown and disclosed in detail is fully capable of attaining the objects and providing the advantages hereinbefore stated, it is to be understood that it is merely illustrative of the presently preferred embodiments of the invention and that no limitations are intended to the details of the construction or design herein shown other than as defined in the appended claims.

We claim:

1. A brake camshaft assembly comprising a camshaft having a cam on one end thereof and an operating arm on its other end, a pair of supporting brackets for said camshaft positioned close to and inwardly of the opposite ends thereof, said brackets including a bearing housing integral therewith and having a bearing interposed between said camshaft and the interior surface of said bearing housing, and at least one of said brackets including a thin-walled main body flexible transversely of the plane thereof and lying in a plane substantially normal to the axis of said camshaft, said one bracket permitting limited movement of said camshaft in a generally axial direction and being relatively rigid and inflexible transversely of the longitudinal axis of said camshaft.

2. A brake camshaft assembly as defined in claim 1 characterized in that both of said brackets are generally similar in construction and flexibility and lying in generally parallel planes near the opposite ends of said camshaft.

3. A brake camshaft assembly as defined in claim 1 characterized in that said camshaft bearing comprises a one-piece tube enclosing said camshaft between the adjacent faces of said cam and of said operating arm, and forming an enclosure for the underlying portion of said camshaft as well as a lubricant retainer and a dirt guard for said camshaft.

4. A brake camshaft assembly as defined in claim 1 characterized in that said camshaft bearing comprises a one-piece tube enclosing said camshaft between the faces of said cam and of said operating arm, means rigidly securing said one bracket to said one-piece tube, and means providing a free floating connection between said tube and the other one of said brackets thereby to permit limited relative movement between said camshaft, said brackets and an axle housing with which said assembly is associated in use under operating load conditions.

5. A unitary camshaft assembly adapted to be mounted along one side of a carriage axle housing with one end positioned to operate brake shoe mechanism for the carriage wheels, said assembly being installable and removable as a unit with respect to said axle housing, said assembly including an elongated main body enclosed in a one-piece dust guard and bearing tube, a cam mounted on one end of said main body and in abutment with one end of said tube, an operating arm mounted on the other end of said main body in abutment with the other end of said tube, and bracket means secured about the opposite ends of said assembly inwardly of said cam and of said operating arm and by which said assembly can be detachably supported along one side of a carriage axle housing and characterized in that said bracket means are flexible in planes lying generally normal to the axis of the main body of said camshaft.

6. A unitary assembly as defined in claim 5 characterized in that said brackets are formed of thin flexible metal lying generally normal to the axis of said camshaft.

7. A camshaft assembly for operating a carriage braking unit, said assembly comprising a camshaft having a brake shoe operating cam fixed to one end thereof and a booster-operated arm mounted on its opposite end, a protective thin-walled tube enclosing said camshaft substantially throughout the portion thereof between said cam and said arm, a pair of flexible cast steel brackets supporting the opposite ends of said protective tube and permitting limited movement of said camshaft axially thereof, and means for charging the interface between said camshaft and said protective tube with lubricant.

8. A camshaft assembly as defined in claim 7 characterized in the provision of flexible seal means between one end of said flexible tube and the adjacent end face of said cam, and resilient means encircling the other end of the camshaft and bearing at one end against said arm and at its other end against the said tube.

9. A camshaft assembly as defined in claim 7 characterized in the provision of a free floating connection between one of said brackets and the adjacent end of said protective tube, and a rigid connection between the other bracket and the adjacent end portion of said protective tube.

References Cited by the Examiner

UNITED STATES PATENTS

| 1,092,342 | 4/1914 | Culver et al. | 188—206 |
| 1,437,492 | 12/1922 | Burrows | 188—206 |
| 3,076,531 | 2/1963 | Hanley et al. | 188—205 |
| 3,144,100 | 8/1964 | Kay | 188—206 X |

DUANE A. REGER, *Primary Examiner.*